United States Patent

[11] 3,607,607

| [72] | Inventors | Duane H. Beninga<br>Golden;<br>Hugh P. Gibbons, Boulder, both of Colo. |
|---|---|---|
| [21] | Appl. No. | 736,527 |
| [22] | Filed | May 27, 1968 |
| [45] | Patented | Sept. 21, 1971 |
| [73] | Assignee | Coors Porcelain Company<br>Golden, Colo.<br>Continuation-in-part of application Ser. No. 638,879, May 16, 1967, now abandoned. |

[54] ORGANIC RESIN CERAMIC COMPOSITE AND METHOD FOR MAKING SAME
17 Claims, 4 Drawing Figs.

[52] U.S. Cl. .................................................. 161/168,
117/27, 117/DIG. 1, 156/114, 156/298, 156/299,
161/39, 161/40, 161/162, 161/213, 161/216,
161/217, 161/221
[51] Int. Cl. ....................................................... B32b 15/08,
B32b 25/02, B32b 27/04
[50] Field of Search ........................................... 161/36, 37,
38, 39, 40, 158, 162, 164, 168, 202, 203, 204, 213,
221, 216; 118/76; 117/DIG. 1, 27; 52/181, 315,
318, 389, 390; 156/89, 114, 293, 298, 299, 303.1,
308; 106/55, 62

[56] References Cited
UNITED STATES PATENTS

| 2,159,935 | 5/1939 | Sanders | 117/DIG. 1 |
| 2,171,438 | 8/1939 | Tarbox | 156/114 |
| 2,265,735 | 12/1941 | Lambert | 52/181 X |
| 2,292,026 | 8/1942 | Gillett | 117/DIG. 1 |
| 2,336,388 | 12/1943 | Beebe | 161/243 X |
| 2,618,572 | 11/1952 | Parrish | 118/76 X |
| 2,641,672 | 6/1953 | Parrish | 117/DIG. 1 |
| 2,962,383 | 11/1960 | Francl et al. | 117/DIG. 1 |
| 3,335,048 | 8/1967 | Morain | 161/38 |
| 3,444,033 | 5/1969 | King | 161/39 X |
| 2,491,412 | 12/1949 | Lecuir | 106/62 |
| 2,947,056 | 8/1960 | Csordas et al. | 106/39 X |
| 3,167,438 | 1/1965 | Bristow | 106/46 |
| 3,377,176 | 4/1968 | Wolkodoff et al. | 106/46 |

FOREIGN PATENTS

| 127,004 | 1960 | U.S.S.R. | 117/DIG. 1 |
| 1,291,148 | 1962 | France | 161/161 |

Primary Examiner—John T. Goolkasian
Assistant Examiner—George W. Moxon, II
Attorney—Barnard, McGlynn & Reising ABSTRACT: A composite of organic resin, preferably an elastomer, and ceramic useful for wear-resistant linings for ball mills, conveyors or chutes for abrasive materials, truck bed linings and the like comprising ceramic pieces with metallized surfaces and with the organic resin bonded to the metallized surfaces of the ceramic, the metallized surfaces being applied to the ceramic by contacting the ceramic with metal, preferably titanium or zirconium with sufficient force and relative motion to cause the metal to be bonded to the ceramic.

PATENTED SEP 21 1971

3,607,607

INVENTORS
Duane K. Beninga,
BY & Hugh P. Gibbons
Barnard, McEllynn & Leising
ATTORNEYS

ORGANIC RESIN CERAMIC COMPOSITE AND METHOD FOR MAKING SAME

This patent application is a continuation-in-part of our U.S. Pat. application Ser. No. 638,879 filed May 16, 1967 now abandoned.

The subject matter of the present invention is an improved composite of an organic resin, preferably rubber or other elastomer, and ceramic, and a method for making same. Composites made in accordance with the present invention are useful in numerous applications where high wear resistance, strength and shock resistance are necessary; for example, conveyor belts, linings for chutes, and conduits for abrasive materials such as rock or metal ores, linings for truck beds and linings for ball mills to grind abrasive materials.

One of the major difficulties in providing organic resin-ceramic composite having optimum desired properties of wear resistance, strength and shock resistence is that of attaining a good bond between the rubber and the ceramic. This is particularly a problem as regards to elastomer-ceramic composites. By the term "elastomer" we means to include not only natural rubber but also all of the various synthetic rubbers or elastomers well known in the art; for example, polychloroprene, polybutylene, Buna-A, elastomeric polyurethane and the like. None of these elastomeric materials provide a really good bond with ceramic, particularly with alumina-base ceramic which is otherwise ideal by reason of its high strength, hardness and wear resistance as compared with other ceramics.

It is the principal object of the present invention to provide an improved organic resin-ceramic composite having greatly increased bond strength between the resin and the ceramic. An attendant object is the provision of an improved method for making such a composite.

Briefly, these objects are accomplished in accordance with the invention by mechanically contacting the ceramic with a solid metal with sufficient force and relative motion between the ceramic and the metal to cause the metal to deposit on and bond to the surface of the ceramic, and then bonding the resin to the metallized surface of the ceramic. A preferred method for depositing the metal on the ceramic is to tumble the ceramic pieces with bodies of the metal, as in a rotating drum, whereby the repeated rubbing contacts between the metal and the ceramic result in the desired metal deposit on the ceramic. For optimum bond strength the preferred metals are titanium and zirconium and of these titanium is the best. However, other metals may be used where the very optimum in bond strength is not necessary for the particular end use of the rubber-ceramic composite being manufactured.

Other objects, features, advantages and embodiments of the invention will be specified in the following detailed description thereof made in part with reference to the appended drawings in which.

THE CERAMIC

Figure 1:
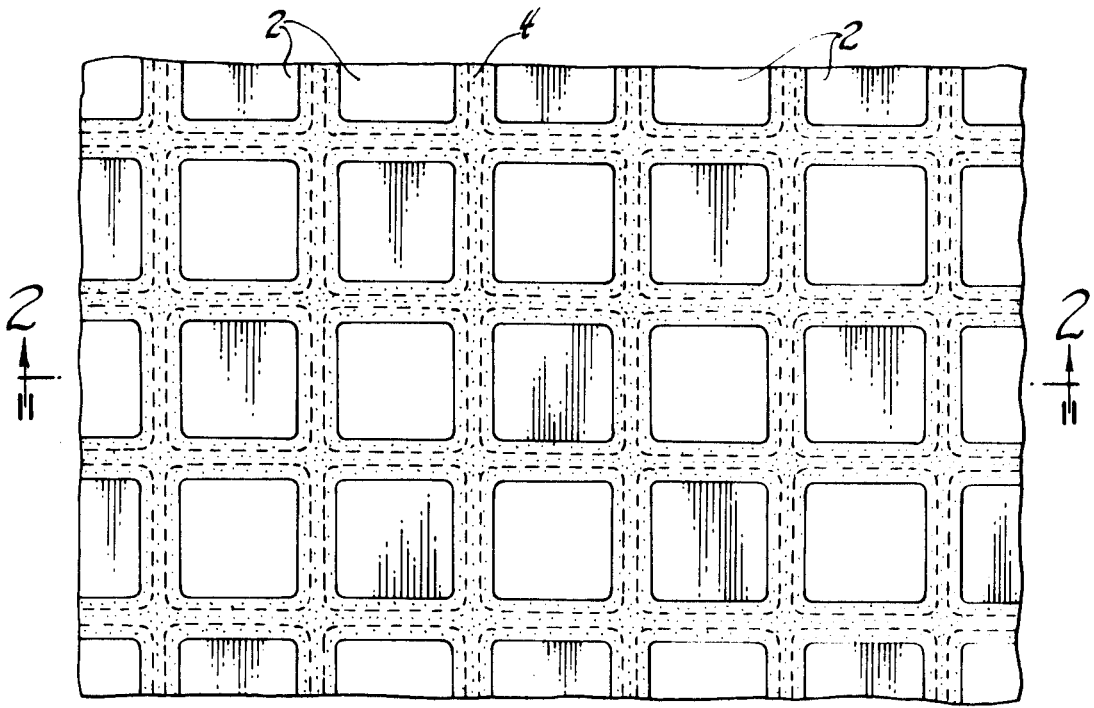
FIG. 1 shows a top view of a portion of ceramic-rubber composite made in accordance with the invention.

By far the preferred ceramic for the practice of the invention is sintered aluminum-oxide-base ceramic. Such a ceramic contains upwards of about 85 percent by weight aluminum oxide and the remainder small amounts of mineralizers or glass-forming oxides which can be added as silica, the silicates such as clay and talc, the alkali and alkaline earth oxides, carbonates, phosphates and the like such as the oxides, phosphates or carbonates of sodium, calcium, strontium and magnesium; and various other of the metal oxides such as chromium oxide, manganese oxide and the rare-earth oxides well known in the art for their glass-modifying or grain-growth-inhibiting effect when used in small amounts in high alumina ceramics. Examples of specific high alumina sintered ceramics are as follows, the percentages in each case being by weight; 100 percent aluminum oxide; 99.5 percent aluminum oxide, 0.5 percent chromium oxide; 94 percent aluminum oxide, 3 percent silica, 3 percent calcium oxide; 90 percent aluminum oxide, 5 percent silica, 3 percent magnesium oxide, 2 percent calcium oxide, 10 percent silica, 3 calcium oxide and 2 percent magnesium oxide. In all of these examples where silica is present in the raw batch, either as such or in a combined form, the final ceramic structure after the sintering operation consists of a dense body of aluminum oxide crystals with an intercrystalline glassy phase. It should be understood that the above specific examples of high alumina ceramic formulations and of additive ingredients for the formulation thereof are only for purposes of illustration and the invention is not limited thereto since numerous other high alumina ceramic formulations are well known in the art and are in widespread commercial manufacture.

Such high alumina sintered ceramics are conventionally manufactured by (1) milling the raw batch ingredients, (2) forming the raw batch into shaped articles by any or various well-known techniques, such as by admixing therewith an organic material, for example wax or a resin, as a temporary binder, and then isostatic or injection molding or dry pressing, and (3) subsequently firing the shaped pieces to sintering temperature which can be anywhere from about 1,400° to 1950° C. In general, the higher the alumina content, the higher the temperature required for sintering to a dense nonporous body.

Aluminum-oxide-base ceramic is preferred because of its extreme hardness and wear resistance and because it is relatively tough and scratch resistant as compared with other ceramics. Also, it can be and currently is manufactured in large commercial quantities at relatively low cost. Sintered alumina ceramic is especially excellent although for many applications fused alumina, particularly as made by fusing bauxite and wherein there is a glassy phase, is desireable. But whereas high alumina ceramic is much preferred, other ceramics can be used in the practice of the invention if desired. For example, beryllium oxide base ceramics and zirconium oxide base ceramics, both well known in the art, can be used if desired, though for most applications at no advantage as compared with aluminum oxide ceramic.

For most applications the alumina or other ceramic used in the practice of the invention should preferably be in the form of bodies of predetermined shape, for example plates, rods, spheres or more complex shapes, though for many uses the ceramic can be random-shaped chips or granules embedded in random orientation in the rubber for most purposes. The individual ceramic pieces should preferably be larger than 100 mesh (Tyler) in size, and ideally larger than one-eighth inches, in at least one dimension. When smaller granular material is used, the metallizing of the surface area thereof results in a relatively high proportion of metal in the overall composition thereby dissipating to some extend the advantages sought to be attained, i.e. the hardness and abrasion resistance provided by the ceramic. In certain applications, however, the advantages of bonded particles less than 100 mesh could outweigh the disadvantages of introducing larger relative amounts of metal to the wearing surface. Where the ceramic consists of random chips or granules, and even where shaped ceramic bodies such as plates, rods or the like are used, the volume of the ceramic on the composite should preferably not exceed 20 times the volume of the resin matrix. Some typical examples of ceramic shapes or pieces for use in the practice of the invention are as follows: alumina ceramic plates 1 inch ×1 inch ×one-half inch for bonding to a rubber backing to serve as an abrasion and wear-resistant conveyor trough for metal ores or similar abrasive materials; plates of larger dimensions but formed to slightly arcuate shaped for bonding to a rubber backing in a cylindrical grinding mill for grinding or milling abrasive materials; spheres of about 1 inch diameter for bonded embedment in a rubber matrix to serve as a heavy-duty conveyor belt for conveying abrasive ores or the like; random-shaped chips ranging in dimensions from about 100 mesh to one-half inch for bonded embedment in rubber to serve as a high traction tire tread for vehicle snow tires.

THE METAL DEPOSIT AND METHOD OF APPLICATION

As alluded to above, the preferred metals for the practice of the invention are titanium and zirconium, particularly titanium. The superiority of these metals stems from the fact that not only do they form a good bond with rubber but also, by reason for their great affinity for oxygen, they chemically bond to the ceramic when brought into forced mechanical contact therewith as by rubbing. However, other metals may be used if desired; for example, aluminum, copper, iron, tin, zinc, magnesium, brass and steel. Of course, it is necessary that the metal (1) be a solid at ambient or room temperature, (2) be softer than the ceramic to which it is applied and (3) be chemically stable; i.e. not highly reactive with the ambient atmosphere such for example as are sodium and potassium.

With the metals other than titanium and zirconium, there is no evidence of a chemical bond between the metal deposit and the ceramic; however, an extremely strong mechanical bond is formed by way of the forceful mechanical contact between the metal and the ceramic.

It is essential to the practice of the invention that the metal between the ceramic and the rubber be applied to the ceramic by forceful mechanical contact such that the metal is abraded or rubbed onto the ceramic, since it is by way of such contact that the good bond strength is accomplished. If, for example, the metal is applied to the ceramic in molten form as by dipping the ceramic pieces into molten metal, little or no bond strength between the metal and the ceramic is accomplished with the result that the bond between the rubber and the ceramic is little if any better than where no intermediate metal layer is used.

A preferred method for applying the metal to the ceramic is to tumble the ceramic pieces with bodies of the metal in a rotating drum until the repeated rubbing action between the ceramic and the metal results in the desired deposit of the metal on the ceramic. With this technique it is preferred that the metal bodies be themselves of sufficient size to provide the required forceful mechanical contact such that the metal is rubbed or abraded onto the ceramic. For example, metal balls having an initial size on the order of one-eighth to 1 inch diameter can be used to good effect. Likewise, random-shaped chunks of metal or small metal rods cut from large diameter metal wire may be used. Of course, as the tumbling continues, the size of the metal bodies will be gradually reduced. In general, the initial size of the metal bodies used in the tumbling technique should be at least about one-fourth mean diameter or cross section.

Another method for the application of the metal to the ceramic is to contact the ceramic pieces with a rotating metal wire brush. As still another means of applying the metal, the ceramic pieces, for example random-shaped ceramic chips, can be shot blasted against the metal desired to be used. Such shot blasting, as by blowing the ceramic against the metal under air pressure or by a mechanical impeller, results in the desired forceful mechanical contact between the metal and the ceramic, portions of the metal being rubbed or abraded onto the ceramic surface during contact.

THE ORGANIC RESIN COMPOSITION AND BONDING

For most uses of the composites, i.e. where an optimum combination of wear resistance and shock resistance is desirable, the much preferred matrix material for the ceramic is elastomer, i.e. natural rubber or any of the various synthetic elastomers well known in the art. To attain the elastomer-to-metallized-ceramic bond, it is simply a matter of vulcanizing or curing the elastomer in contact with the metallized ceramic pieces by using well known vulcanizing and curing procedures such, for example, as those commonly used in the vulcanized bonding of rubber or the bonding of other elastomers to metal bodies. The metallized ceramic pieces, be they random-shaped granules or chips, or preformed spheres or the like, can be admixed into the elastomer formulation and the mixture then molded and vulcanized in accordance with the techniques well known in the elastomer-fabricating art. Where the ceramic pieces are desired only at the surface of the elastomeric article, the ceramic pieces, for example, plates with at least the elastomer-contacting surfaces thereof metallized, can be pressed or embedded into the unvulcanized elastomer solid or liquid, with or without conventional activator cement coating, and the elastomer than vulcanized or cured thereby to attain the strong bond between the rubber and the metallized ceramic.

As alluded to above, where an optimum combination of wear resistance and shock resistance is important, an elastomer should be used as the organic resin in which the ceramic is embedded. It is more difficult to attain a strong bond of ceramic to rubber or other elastomer than to various other organic resins and hence the invention serves to particular advantage where elastomer is used. However, the mechanically applied metallized surface of this invention, particularly titanium or zirconium, does provide an increase in bond strength between the ceramic and organic resins other than the elastomers, and for some uses of the composites, the nonelastomeric resins are excellent. In general, the nonelastomeric resins serve well as the matrix material for the ceramic where wear resistance is the property most needed and with a lesser requirement for shock resistance. For example, organic resins such as epoxy resin or polyester resin, preferably with fiber glass reinforcement, serve well as the matrix for the metallized ceramic in conduit linings for abrasive materials, in wear resistance collars for rotary shafts or the like in an abrasive environment, and in armorplate. The important point is that by way of the present invention, greatly increased bond strength between the organic resin and the ceramic can be accomplished and the organic resin can be selected, for any particular application, with other characteristics in mind to best meet the needs of that application at the least cost.

ADDITIONAL DESIRABLE DETAILS OF CONSTRUCTION AND PROCESSING

Where the metal used is titanium or zirconium, the ceramic surface to which the metal is applied can be extremely smooth and in fact it is desirable that it be extremely smooth at least at the outset of the operation wherein the metal is applied. During application of the metal, particularly as by tumbling, the surface may, of course, become more rough by reason of the repeated contacts between bodies. Using titanium metal we have been able to accomplish greater bond strengths with an initially lapped smooth ceramic surface than with a ceramic surface which has been roughened.

On the other hand, where the metal is other than titanium or zirconium, it is preferred that the ceramic surface be rough and if the as-fired ceramic has extremely smooth surfaces, it is preferable to deliberately roughen the surfaces as by sand-blasting or rough grinding prior to applying the metal. This results in higher bond strengths.

We theorize that this distinction between titanium and zirconium on the one hand and the other metals on the other hand, stems from the fact that when the former metals are applied in accordance with the invention the attachment to the ceramic is principally, if not entirely, due to chemical bonding whereas when the metal applied is other than titanium or zirconium the attachment is due to mechanical bonding. A roughened surface enhances mechanical bonding whereas a smooth surface enhances chemical bonding. Using titanium or zirconium, we have accomplished the best bond strength using ceramic pieces having a surface finish, at the initiation of the metallizing, of less than 10 RMS (root means square)

microinches though excellent bond strength can also be accomplished with surfaces rougher than this. Using metals other than titanium or zirconium, the ceramic surface finish should be greater than 10 RMS microinches to accomplish the best bond strength.

It is preferable that the metal deposit on the ceramic surface be discontinuous rather than continuous. That is, it is desirable that the metal deposit be interrupted by small areas of exposed ceramic though a major portion of the total ceramic surface area should be covered with the metal. Ideally, the metal deposit should consist of the highest possible density of individual spots minutely separated from each other by exposed ceramic. We theorize the reason for this is that a metal deposit consisting of a network of minutely separated metallized areas can withstand greater thermal and mechanical stresses than can a continuous film of metal even though the latter should theoretically provide greater bond strength.

When the tumbling method is used to apply the metal to the ceramic a certain amount of metal powder and ceramic powder are formed and an excessive buildup of such a powder in the mill tends to reduce efficiency by reason of its cushioning effect which absorbs the energy of impact between the metal bodies and the ceramic pieces. The period of tumbling required to attain the desired coverage of metal deposit on the ceramic will, of course, depend upon the hardness of the metal being applied, the size of the drum and the rate of drum rotation, the weight of the metal bodies used and other factors. Hence, tumbling runs can be anywhere from about a half hour to in excess of 20 hours. In any case, it is best to remove loose powder from the tumbling drum between runs and if excessive powder buildup during a run is experienced, this can be corrected by utilizing a perforated tumbling drum such that loose powder generated is continuously removed by dropping through the perforations.

Particularly where titanium or zirconium is used as the metal, for optimum protection against fire or explosion hazard it is preferable to utilize a nitrogen atmosphere in the tumbling drum.

Where the metal used is other than titanium of zirconium, the amount of impact force required between the metal bodies and the ceramic pieces to accomplish the desired deposit is a function of the hardness of the metal. That is, the harder the metal, the greater the impact force required to attain deposition of the metal on the ceramic with good mechanical interlock in between. However, where the metal used is either titanium or zirconium, high impact forces are always desirable for optimum attainment of the chemical bonding. In other words, the greater the impact force the greater the kinetic energy input, and with high energy input there is optimum assurance of the desired chemical bonding. With the tumbling method, for any given-sized drum and for any given-sized metal bodies, the impact forces can be increased by increasing the rotational speed.

EXAMPLE

Aluminum oxide base ceramic pieces, 1 inch square and with a thickness of about one-half inch were placed in a tumbling drum having a diameter of about 12½ inches and titanium bodies consisting of rods about one-half inch long and one-fourth inch in diameter were added to the drum. The ceramic pieces had a surface finish of about 10—15 RMS microinches and were cleaned to remove grease and other surface contaminants. A nitrogen atmosphere was maintained in the drum as it was rotated at a speed of about 50 r.p.m. Tumbling by drum rotation was continued for 4 hours. The ceramic pieces were then removed from the drum and were rinsed to remove loose particles and then thoroughly dried. The pieces were of a grey color due to the deposited titanium. The pieces were then embedded in a rubber backing and the rubber vulcanized in accordance with conventional practice. The bond strength between the ceramic pieces and the rubber was so great that upon applying ever-increasing pulling force, failure occurred, not between the rubber and the metallized ceramic, but rather in the rubber.

Figure 2:
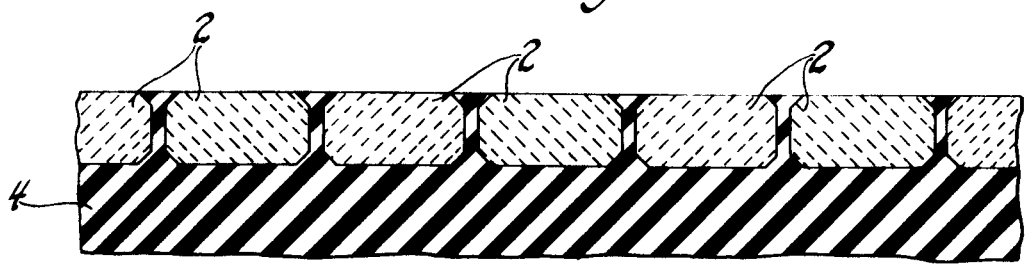
FIG. 2 is a sectional view taken on the line 2—2 of FIG. 1.
Figure 3:
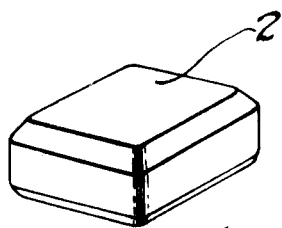
FIG. 3 is a perspective view of one of the ceramic pieces of the composite shown in FIGS. 1 and 2.
Figure 4:
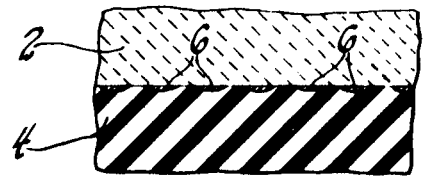
FIG. 4 is a cross-sectional view, in greatly enlarged scale, of the interface between the metallized ceramic and the rubber of the composite shown in FIGS. 1 and 2.

FIGS. 1 and 2 of the attached drawing show a ceramic-rubber composite made in accordance with the invention and comprising square ceramic pieces 2, metallized as described above and embedded in and bounded to the surface of a rubber backing layer 4. FIG. 3 shows one of the metallized ceramic pieces and FIG. 4 shows a magnified cross-sectional view of the inner face between the bonded rubber and the metallized ceramic, the metal which is bonded to the ceramic being shown at 6. The metal deposit on the ceramic surface is discontinuous, the areas covered by the metal being interrupted by small areas of ceramic in contact with the rubber.

It will be understood that whereas the invention has been described in detail with reference to preferred embodiments thereof, various changes and modifications may be made all within the full and intended scope of the claims which follow.

The embodiments of the invention in which an exclusive property or privilege is claimed are defined as follows:

1. An organic resin-ceramic composite comprising at least one ceramic piece bonded to an organic resin through an intermediate metal deposit applied to the ceramic piece by contacting the ceramic piece with a solid metal with sufficient force and motion to cause metal to be rubbed onto and bonded to the ceramic piece, said ceramic piece being of ceramic containing at least about 85 percent by weight aluminum oxide and said metal being selected from the group consisting of titanium and zirconium.

2. An organic resin-ceramic composite as set forth in claim 1 wherein said organic resin is an elastomer.

3. An organic resin-ceramic composite as set forth in claim 1 wherein said metal deposit is interrupted by a plurality of small portions of the surface of said ceramic piece which are in direct contact with said resin.

4. An organic resin-ceramic composite as set forth in claim 1 wherein there are a plurality of closely spaced ceramic pieces of predetermined shape.

5. An organic resin-ceramic composite as set forth in claim 1 wherein said metal is titanium.

6. An organic resin-ceramic composite comprising at least one ceramic piece bonded to an organic resin through an intermediate deposit of metal selected from the group consisting of titanium and zirconium, said ceramic piece being of ceramic containing at least about 85 percent by weight aluminum oxide and said metal deposit being interrupted by a plurality of small portions of the surface of said ceramic which are in direct contact with the resin.

7. A composite as set forth in claim 6 wherein said resin is an elastomer.

8. An organic resin-ceramic composite comprising at least one ceramic piece bonded to an organic resin through an intermediate deposit on said ceramic of a solid metal which is softer than said ceramic and which is applied to the ceramic piece by contacting the ceramic piece with the metal with sufficient force and motion to cause the metal to be rubbed onto and bonded to the ceramic piece, said ceramic piece being of a ceramic containing at least about 85 percent by weight aluminum oxide.

9. An organic resin-ceramic composite as set forth in claim 8 wherein said organic resin is an elastomer.

10. An organic resin-ceramic composite as set forth in claim 8 wherein said metal deposit is interrupted by a plurality of small portions of the surface of said ceramic piece which are in direct contact with the resin.

11. A method for making an organic resin-ceramic composite comprising the steps of contacting a ceramic piece with solid metal with sufficient force and relative motion to cause metal to be rubbed onto and bonded to said ceramic piece and then bonding organic resin to the resultant metallized surface of said ceramic piece, said ceramic piece being of ceramic containing at least about 85 percent by weight aluminum oxide and said metal being selected from the group consisting of titanium and zirconium.

12. A method as set forth in claim 11 wherein said organic resin is an elastomer.

13. A method as set forth in claim 11 wherein said ceramic piece is of predetermined shape.

14. A method as set forth in claim 13 wherein the surface of the ceramic piece, prior to being contacted by said metal, has a finish of less than 10 RMS microinches.

15. A method as set forth in claim 11 wherein said first step is performed by tumbling a plurality of ceramic pieces with bodies of the metal.

16. A method for making an organic resin-ceramic composite comprising embedding into and bonding to an organic resin material at least one sintered alumina-base ceramic piece containing at least about 85 percent by weight aluminum oxide and having titanium metal on the surface thereof, said titanium metal having been applied by contacting the ceramic with solid titanium with sufficient force and relative motion to cause the titanium to be rubbed onto and bonded to the ceramic piece.

17. A method as set forth in claim 16 wherein said organic resin is an elastomer.